(12) United States Patent
Banks et al.

(10) Patent No.: US 9,032,012 B2
(45) Date of Patent: May 12, 2015

(54) CONFIGURABLE PACING FOR MESSAGING SYSTEMS

(75) Inventors: Andrew D. J. Banks, Romsey (GB); Jonathan Isaac, Winchester (GB); Jonathan Levell, Winchester (GB); Trevor Lobban, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 13/169,988

(22) Filed: Jun. 27, 2011

(65) Prior Publication Data

US 2012/0331030 A1 Dec. 27, 2012

(51) Int. Cl.
*G06F 15/16* (2006.01)
*G06F 9/54* (2006.01)

(52) U.S. Cl.
CPC ...................................... *G06F 9/544* (2013.01)

(58) Field of Classification Search
USPC .......................................... 709/201, 204–206
See application file for complete search history.

(56) References Cited

U.S. PATENT DOCUMENTS

| | | | | |
|---|---|---|---|---|
| 5,918,020 A | * | 6/1999 | Blackard et al. | 709/228 |
| 5,983,292 A | * | 11/1999 | Nordstrom et al. | 710/54 |
| 6,654,343 B1 | * | 11/2003 | Brandis et al. | 370/229 |
| 8,761,012 B2 | * | 6/2014 | Yamada et al. | 370/231 |
| 2003/0135546 A1 | * | 7/2003 | Yoshioka | 709/203 |
| 2004/0151114 A1 | * | 8/2004 | Ruutu | 370/230 |
| 2004/0244007 A1 | * | 12/2004 | Garza et al. | 718/105 |
| 2009/0024817 A1 | * | 1/2009 | Oved | 711/170 |
| 2010/0017492 A1 | * | 1/2010 | Reistad | 709/206 |
| 2011/0142064 A1 | * | 6/2011 | Dubal et al. | 370/412 |

* cited by examiner

*Primary Examiner* — Jason Recek
(74) *Attorney, Agent, or Firm* — Steven M. Greenberg, Esq.; CRGO Law

(57) ABSTRACT

Embodiments of the present invention provide a method, system and computer program product for configurable pacing in messaging systems. In an embodiment of the invention, a configurable message pacing method has been provided. The method includes receiving a message directed for placement in a repository of an intermediate messaging system into which messages are placed by message producing applications and from which messages are retrieved by message consuming applications. Thereafter, it can be determined if the placement of the received message into the repository will result in a breach of an associated threshold value for the repository. Consequently, a message pacing action can be triggered responsive to the determination that the placement of the received message into the repository will result in a breach of the associated threshold value for the repository.

19 Claims, 1 Drawing Sheet

CONFIGURABLE PACING FOR MESSAGING SYSTEMS

BACKGROUND OF THE INVENTION

1. Field of the Invention

The present invention relates to the field of messaging and more particularly to message queue management in a messaging system.

2. Description of the Related Art

In the field of information technology, messaging refers to the exchange of information between two computing processes. A message can be something as simple as just a few bits of data, or something as robust as an electronic mail message containing embedded multimedia imagery. In its simplest form, a messaging system acts to directly exchange messages between messaging partners. Inter-process communications methods facilitate message passing between processes in a computer communications network. E-mail messaging systems rely upon messaging servers both to transmit and receive messages onto a network, and instant messaging systems moderate and facilitate the exchange of instantaneous messages between chat partners.

Message queues provide an asynchronous mode of message passing between processes. In a message queuing system, applications can submit messages to a queue for delivery to subscribing clients who can consume the messages in the queue at a later time. To the extent that a uniform message structure can be agreed upon between message provider and message consumer, a message queue can provide an ideal solution for disparate applications seeking to communicate without requiring internal codification for compatibility with one another.

In messaging systems incorporating message queues, if more messages are placed into the queue by message providing applications than are retrieved from the queue by message consumers, over a prolonged period of time a number of problems are likely to occur. First, the unintended storage of the messages in the queue necessarily will require additional storage resources and, in particular, memory buffers will fill to capacity. Once the memory buffers have become are full, a step change can occur—messages take a long time to retrieve from disk and the problems compound. If, for some reason, a temporary deluge of messages occurs the deluge can cause this "step change" meaning that the system suddenly can not keep pace with its usual workload and, in order for the system to recover, messages have to be temporarily restricted from being put into the system.

Traditionally, messaging systems employ "pacing" to ameliorate the problem. In message pacing, a feature is provided in which if messages are observed to have been queued at a faster than desired rate, a short delay is added to the enqueueing of the messages. From an applications point of view pacing is effectively invisible and can help in many circumstances. Yet, pacing is not a universal panacea—if the same applications are retrieving messages as putting them then delaying the enqueuing of messages in a message queue also delays the dequeueing of messages from the queue and achieves no net progress in reducing the message queue size. However, the added delays act to reduce throughput over all.

BRIEF SUMMARY OF THE INVENTION

Embodiments of the present invention address deficiencies of the art in respect to pacing for message queues and provide a novel and non-obvious method, system and computer program product for configurable pacing in messaging systems. In an embodiment of the invention, a configurable message pacing method has been provided. The method includes receiving a message directed for placement in a repository of an intermediate messaging system into which messages are placed by message producing applications and from which messages are retrieved by message consuming applications. Thereafter, it can be determined if the placement of the received message into the repository will result in a breach of an associated threshold value for the repository. Consequently, a message pacing action can be triggered responsive to the determination that the placement of the received message into the repository will result in a breach of the associated threshold value for the repository.

In one aspect of the embodiment, the repository is a message queue. In another aspect of the embodiment, the threshold value is a number of messages in the repository. In yet another aspect of the embodiment the threshold value is an amount of disk space consumed by the repository. In even yet another aspect of the embodiment, the message pacing action is prompting an application directing the placement in the repository of the message to delay placement of subsequent messages into the repository. Finally, in an aspect of the embodiment, the message pacing action is the automatic message pacing of all messages directed for placement into the repository.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for configurable pacing in messaging systems. In accordance with an embodiment of the invention, an intermediate message repository such as a message queue into which messages are placed by message providers and removed by message consumers can be configured with a threshold value corresponding to a level of messages pending within the repository for retrieval by message consumers. Thereafter, in response to determining that the placement of a message into the repository by a message provider will result in the breach of the threshold value, at least one message pacing measure can be triggered. For example, the message provider can be prompted to delay subsequent placements of messages into the repository, or the message provider can be prompted to delay placement of the message into the repository, or to avoid placing additional messages into the repository, or subsequent messages can be delayed automatically if the message provider chooses to submit a message despite the request for a delay. In this way, the adjustment of the threshold can provide a configurable manner in which a messaging system administrator can control the degree to which the messaging system can manage a surge in message placements into the repository.

Figure 1:
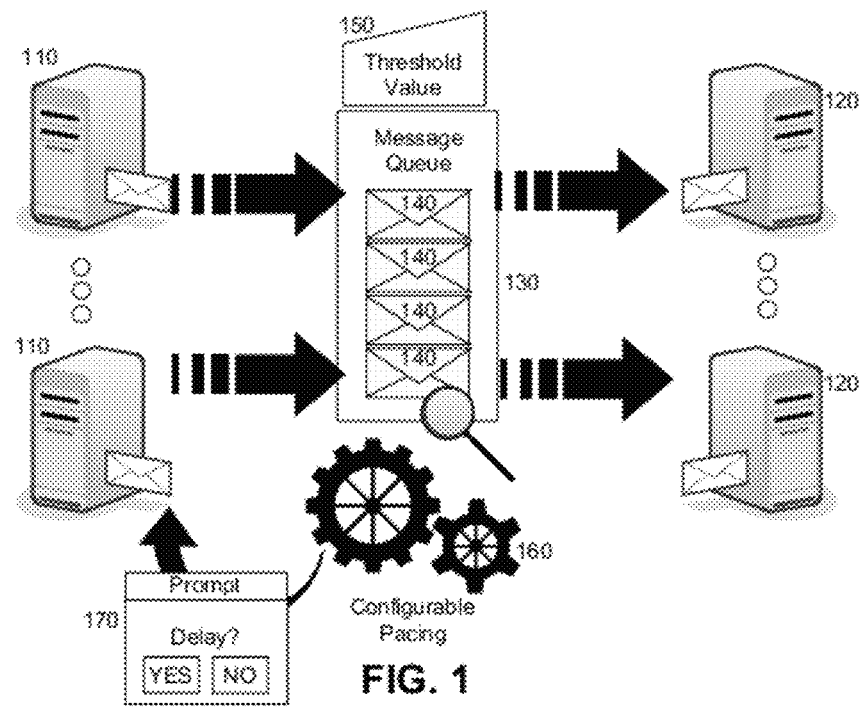
FIG. 1 is a pictorial illustration of a process for configurable pacing in messaging systems.

In further illustration, FIG. 1 pictorially shows a process for configurable pacing in messaging systems. As shown in FIG. 1, message providing applications 110 can provide messages 140 for storage in a message queue 130 and subsequent retrieval by message consuming applications 120. It is to be understood, however, that the message providing applications 110 can also be the message consuming applications 120 utilizing the message queue 130 as an inter-process communications mechanism. A threshold value 150 can be applied to the message queue 130 corresponding to a desired capacity of the message queue 130. For instance, the threshold value 150 can be a desired number of messages 140 in the message queue 130 beyond which the message queue 130 can be considered at over-capacity, or an amount of resources consumed in consequence of too many messages 140 remaining in the message queue 130 and not yet removed by message consuming applications 120.

Configurable pacing logic 160 can monitor the number of messages 140 in the message queue 130 and the threshold value 150. When an attempt to place a new message in the message queue 130 is recognized by the configurable pacing logic 160 to likely cause the breach of the threshold value 150, a configurable pacing action 170 can be triggered. For example, the message providing application 110 attempting to enqueue the new message into the message queue 130 can be prompted either to delay subsequent messages enqueued into the message queue 130 or to delay enqueueing the new message into the message queue 130. Alternatively, pacing can be initiated without prompting the message providing applications 110.

In the latter instance, the automatic pacing can be performed on an individual basis based upon a pre-configured parameter of a delay for each message providing application 110 considered acceptable by the message providing application 110. Alternatively, different delays can be ascribed to different message providing applications 110 based upon the identity or class of application determinable in reference to a user name or a network address, by way of example. Even further, a delay can be computed dynamically according to an estimate of a requisite delay in order to remediate the likely breach of the threshold value 150. For instance, the estimate can be computed based upon a tabulation of empirical data of past delays and resulting improvements in queue length. In any case, the adjustment of the threshold value 150 can provide a degree of control over the performance of pacing in a messaging system so as to permit strategic quality of service goals with respect to the performance of the messaging system, the applications 110, 120, or both.

Figure 2:
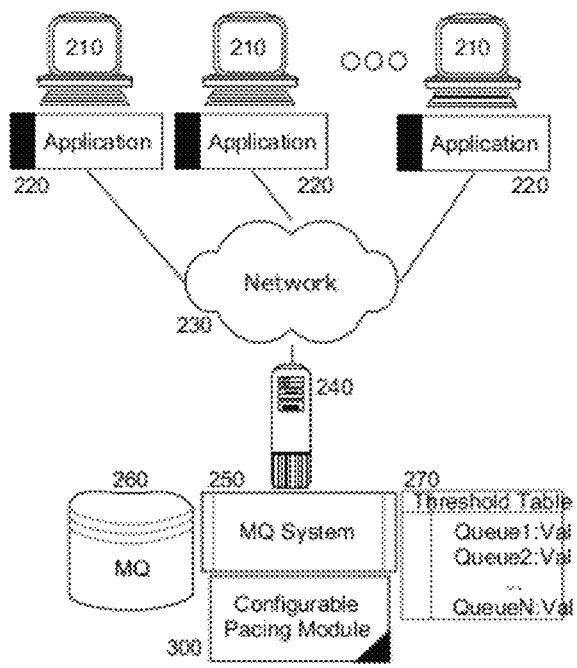
FIG. 2 is a schematic illustration of a messaging data processing system configured for configurable pacing; and, FIG. 3 is a flow chart illustrating a process for configurable pacing in messaging systems.

The process described in connection with FIG. 1 can be implemented within a messaging data processing system. In further illustration, FIG. 2 schematically shows a messaging data processing system configured for configurable pacing. The system can include a host server 240 configured with at least one processor and memory and communicatively coupled to multiple different client computing devices 210 over computer communications network 230. The host server 240 can support the operation of a message queueing system 250 providing asynchronous messaging between different applications 220 by way of one or more message queues 260. Of note, one or more message queues 260 supported by the message queueing system 250 can be configured with a threshold value stored in a threshold table 270. In this regard, the threshold value can correspond to a desired capacity of an associated one of the message queues 260.

Configurable pacing module 300 can be coupled to the messaging queueing system 250. The configurable pacing module 300 can include program code that when executed in the memory of the host server 240 can be enabled to monitor a number of messages in each one of the message queues as new messages are provided for enqueuement. When an attempt to place a new message in one of the message queues 260 is recognized by the program code of the configurable pacing module 300 to likely cause the breach of an associated threshold value in the threshold table 270, a configurable pacing action can be triggered. For example, the triggered action can include prompting the application 220 attempting to providing the new message to delay either to delay subsequent messages enqueued into the associated one of the message queues 260, or enqueueing the new message into the associated one of the message queues 260. Alternatively, pacing can be initiated without prompting the applications 220.

Figure 3:
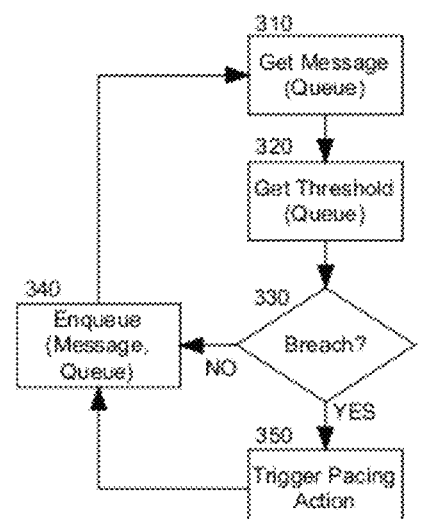

In yet further illustration of the operation of the configurable pacing module 300, FIG. 3 is a flow chart illustrating a process for configurable pacing in messaging systems. Beginning in block 310, a message can be received in a message queueing system for placement in a particular message queue. In block 320, a threshold can be identified for the particular message queue. Thereafter, in decision block 330 it can be determined whether or not the placement of the message into the particular message queue is likely to cause a breach of the threshold value. If not, in block 340 the message can be enqueued into the particular message queue. However, if a breach of the threshold value is determined likely in decision block 330, in block 350 a pacing action for the particular message queue can be triggered and subsequently in block 340 the message can be enqueued into the particular message queue. In this way, the adjustment of the threshold value for the particular message queue can permit the tuning of performance of the message queue in response to a flooding of messages and the triggering of message pacing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a computer readable storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A configurable message pacing method comprising:
   receiving a message in a message queuing system having a plurality of repositories in a host server communicatively coupled to multiple different client computing devices over a computer communications network, the message being received from one of the different client computing devices and being directed for placement in one of the plurality of repositories;

determining by the message queuing system whether the placement of the received message into a repository of the plurality of repositories will result in a breach of an associated threshold value for the repository of the plurality of repositories, wherein each repository of the plurality of repositories is associated with a different threshold value; and, triggering a message pacing action based upon determining either an identity or a class of an application in reference to either a user name or a network address and also determining pacing of the received message based upon the application according to the determined identity or class responsive to the determination that the placement of the received message into the repository of the plurality of repositories will result in the breach of the associated threshold value for the repository of the plurality of repositories.

2. The method of claim 1, wherein the repository of the plurality of repositories is a message queue.

3. The method of claim 1, wherein the associated threshold value is a number of messages in the repository of the plurality of repositories.

4. The method of claim 1, wherein the associated threshold value is an amount of disk space consumed by the repository of the plurality of repositories.

5. The method of claim 1, wherein the message pacing action is prompting an application directing the placement of the received message in the repository of the plurality of repositories to delay placement of subsequent messages into the repository of the plurality of repositories.

6. The method of claim 1, wherein the message pacing action is the automatic message pacing of all messages directed for placement into the repository of the plurality of repositories.

7. The method of claim 1, wherein the message pacing action is prompting an application directing the placement of the received message in the repository of the plurality of repositories to delay placement of the received message into the repository of the plurality of repositories.

8. A messaging data processing system comprising:
a host server communicatively coupled to multiple different client computing devices over a computer communications network, the host server including:
at least one processor and memory;
a message queuing system providing asynchronous messaging among message producing applications and message consuming applications in the different client computing devices;
a plurality of repositories of messages coupled to the message queuing system;
a threshold table of thresholds, each threshold being associated with a different one of the repositories; and,
a configurable pacing module coupled to the message queuing system, the configurable pacing module comprising program code enabled to determine whether placing a received message into a specified one of the plurality of repositories result in a breach of an associated threshold value for the specified one of the plurality of repositories, and to trigger a message pacing action based upon determining either an identity or a class of an application in reference to either a user name or a network address and also determining pacing of the received message based upon the application according to the determined identity or class responsive to the determination that placing the received message into the specified one of the plurality of repositories will result in the breach of the associated threshold value.

9. The system of claim 8, wherein the plurality of repositories are message queues.

10. The system of claim 8, wherein the associated threshold value is a number of messages in an associated one of the plurality of repositories.

11. The system of claim 8, wherein the associated threshold value is an amount of disk space consumed by an associated one of the plurality of repositories.

12. The system of claim 8, wherein the message pacing action is prompting an application directing the placement of the received message in the specified one of the plurality of repositories to delay placement of subsequent messages into the specified one of the plurality of repositories.

13. The system of claim 8, wherein the message pacing action is the automatic message pacing of all messages directed for placement into the specified one of the plurality of repositories.

14. A computer program product for configurable message pacing, the computer program product comprising:
a computer readable storage medium having computer readable program code embodied therewith, the computer readable program code comprising:
computer readable program code for receiving a message in a message queuing system having a plurality of repositories in a host server communicatively coupled to multiple different client computing devices over a computer communications network, the message being received from one of the different client computing devices and being directed for placement in one of the plurality of repositories;
computer readable program code for determining whether the placement of the received message into a repository of the plurality of repositories will result in a breach of an associated threshold value for the repository of the plurality of repositories, wherein each repository of the plurality of repositories is associated with a different threshold value; and,
computer readable program code for triggering a message pacing action based upon determining either an identity or a class of an application in reference to either a user name or a network address and also determining pacing of the received message based upon the application according to the determined identity or class responsive to the determination that the placement of the received message into the repository of the plurality of repositories will result in the breach of the associated threshold value for the repository of the plurality of repositories.

15. The computer program product of claim 14, wherein the repository of the plurality of repositories is a message queue.

16. The computer program product of claim 14, wherein the threshold value is a number of messages in the repository of the plurality of repositories.

17. The computer program product of claim 14, wherein the associated threshold value is an amount of disk space consumed by the repository of the plurality of repositories.

18. The computer program product of claim 14, wherein the message pacing action is prompting an application directing the placement of the received message in the repository of the plurality of repositories to delay placement of subsequent messages into the repository of the plurality of repositories.

19. The computer program product of claim 14, wherein the message pacing action is the automatic message pacing of all messages directed for placement into the repository of the plurality of repositories.

* * * * *